(12) United States Patent
Kulishov

(10) Patent No.: US 6,353,690 B1
(45) Date of Patent: Mar. 5, 2002

(54) ELECTRICALLY ADJUSTABLE DIFFRACTION GRATING

(76) Inventor: Mykola Kulishov, 8188 de Gaspé, Apt. 1, Montreal, Quebec (CA), H2P 2J8

( * ) Notice: Subject to any disclaimer, the term of this patent is extended or adjusted under 35 U.S.C. 154(b) by 0 days.

(21) Appl. No.: 09/504,734

(22) Filed: Feb. 16, 2000

(30) Foreign Application Priority Data

Feb. 16, 1999 (CA) .............................................. 2261197

(51) Int. Cl.$^7$ .............................................. G02F 1/295
(52) U.S. Cl. ................................. 385/10; 385/8; 385/9; 385/37
(58) Field of Search ................................. 385/10, 37, 8, 385/2, 9, 14, 16, 40, 130, 131

(56) References Cited

U.S. PATENT DOCUMENTS

| | | | |
|---|---|---|---|
| 3,813,142 A | 5/1974 | Buhrer | 385/10 |
| 4,006,963 A | 2/1977 | Baues et al. | 385/10 |
| 4,008,947 A | 2/1977 | Baues et al. | 385/10 |
| 4,054,362 A | 10/1977 | Baues | 385/2 |
| 4,057,321 A | 11/1977 | Mahlein et al. | 385/37 |
| 4,115,747 A | 9/1978 | Sato et al. | 385/10 |
| 4,466,703 A | 8/1984 | Nishimoto | 385/10 |
| 4,645,293 A | 2/1987 | Yoshida et al. | 385/21 |
| 4,737,007 A | 4/1988 | Alferness et al. | 385/37 |
| 5,022,730 A | 6/1991 | Cimini et al. | 385/37 |
| 5,115,344 A | 5/1992 | Jaskie | 385/10 |
| 5,133,028 A | 7/1992 | Okayama et al. | 385/11 |
| 5,233,187 A | 8/1993 | Sakata et al. | 385/37 X |
| 5,285,274 A | 2/1994 | Tanno et al. | 385/129 |
| 5,349,466 A | 9/1994 | Delacourt et al. | 385/122 X |
| 5,438,637 A | 8/1995 | Nilsson et al. | 385/10 |
| 5,581,641 A | * 12/1996 | Deacon et al. | 385/15 |
| 5,581,642 A | 12/1996 | Deacon et al. | 385/15 |
| 5,729,641 A | 3/1998 | Chandonnet et al. | 385/2 |

OTHER PUBLICATIONS

J.M. Hammer, "Digital Electro–Optic Grating Deflector and Modulator", Appl. Phys. Lett., vol. 18, No. 4, pp. 147–149 (1971).

Heihachi Sato et al., "A New Electrically Controllable Diffraction Grating Using Polarization Reflection", Journal of Applied Physics, vol. 47, No. 9, pp. 4031–4032 (1976).

Toshio Utsunomiya, et al., "Electrically Deformable Diffraction Grating Using A Piezoelectric Material", Ferroelectrics, 27, 27–30 (1980).

Q. W. Song, et al., "PLZT Based High–Efficiency Electro–Optic Grating for Optical Switching", Journal of Modern Optics, 41 No. 4, pp. 717–727 (1994).

(List continued on next page.)

Primary Examiner—Phan T. H. Palmer
(74) Attorney, Agent, or Firm—Darby & Darby

(57) ABSTRACT

A diffraction grating for a waveguide or for externally incident light. The grating includes a substrate and an electrooptic structure extending over it. The electrooptic structure may include a waveguide having a propagation axis. A first and a second electrode structure are provided on either side of the electrooptic structure so that an electric field is generated in the electrooptic structure when a potential is applied to the electrodes. The first electrode structure has an interdigitated configuration defining a plurality of fingers. In use, respective potentials $V_0$ and $V_0+\Delta V$ are applied to adjacent fingers. The diffraction grating induced in the electrooptic structure by the periodic electric field advantageously has a refractive index adjustable by varying $V_0$ and $\Delta V$ and a spatial periodicity adjustable by varying $\Delta V$.

20 Claims, 11 Drawing Sheets

OTHER PUBLICATIONS

Q.W. Song, et al., "High–Efficinecy Electro–Optic Grating Switch with Improved Performance", Appl. Opt. 35 pp. 7031–7036 (1996).

K. Yamanouchi, et al., "Nanometre Electrode Fabrication Technology Using Anodic Oxidation Resist Films and Applications to 10GHz Surface Acoustic Wave Devices", Electronics Letters 30, 1010 (1994).

Zhaoning Yu, et al. "Nanoscale GaAs Metal–Semiconductor–Metal Photodetectors Fabricated Using Nanoimprint Lithography," Appln Phys. Letter 74, No. 16, pp. 2381–2383 (1999).

P.P. Nolting, et al. "Syngrat, an Electrooptically Controlled Tunable Filter With a Synthesized Grating Structure", Optical and Quantum Electronics, 7 (1995) 887–896.

D. Brooks, et al., "Integrated Electrooptic Multielectrode Tunable Filter", Journal of Lightwave Technology, vol. 13, No. 7 1508–1513 (1995).

* cited by examiner

FIG. 5a
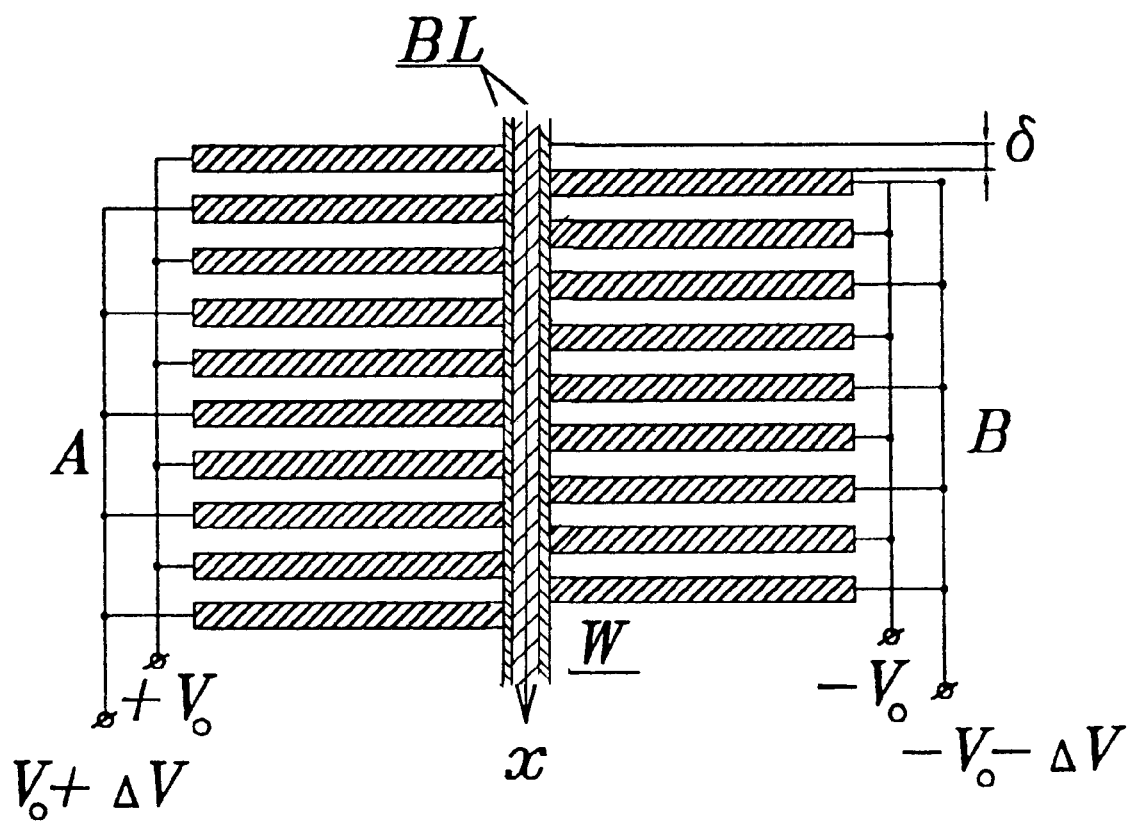
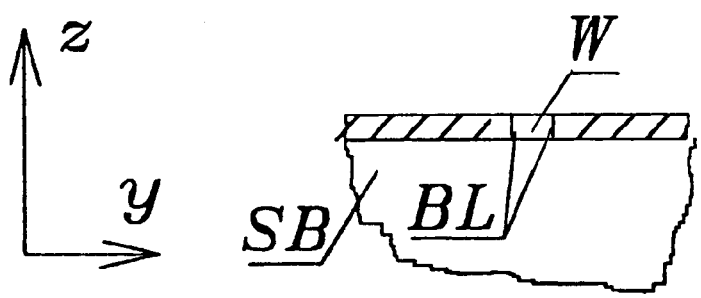
FIG. 5b $\Delta V = -V_0$ $\Delta V = -2V_0$

ELECTRICALLY ADJUSTABLE DIFFRACTION GRATING

FIELD OF THE INVENTION

The present invention relates to the field of diffraction gratings, and more particularly concerns such a grating having electrically adjustable refractive index and spatial periodicity.

BACKGROUND OF THE INVENTION

Periodic structures or gratings are of tremendous importance in the field of optical communications due to the variety of functions they can perform. For example, the phase matching function of a grating gives rise to various couplers of two or more waves satisfying the matching conditions. Gratings are also elements of high wavelength dispersion, and this allows their application to a number of devices of wavelength-division multiplexing technology. For light propagating inside a waveguide, such as an optical fiber or any other type, gratings can serve as input/output couplers, waveguide interfaces, mode/polarization convertors, mode/polarization filters, deflectors, reflectors, etc. For externally incident light waves, gratings can serve as optical modulators or light switchers.

Known periodic structures for integrated optics include passive (static) optical gratings, where the grating is produced in the form of periodic surface relief or refractive index change. This grating is therefore fixed, and consequently cannot be <<switched off>>, and its diffraction efficiency cannot be controlled. It is known that the diffraction efficiency of the diffraction can be modified by dynamically varying the refractive index of the material used. To achieve this, one solution employed in the prior art is to use the electrooptic effect, Kerr or Pockels, to electrically vary the refractive index, the periodic function of the index to be modified then being determined by rows of surface or embedded interdigital electrodes. An electric potential is applied to such an electrode structure to then create an electrically controlled diffraction grating. The coupling coefficient between incident and diffracted modes is proportional to the amplitude of the effective index variation induced by the voltage on the electrodes. Therefore, increasing the applied voltage $V_0$ increases the coupling between the interacting modes. In this sense, the grating can be considered an adjustable one. However, with such a design, it is impossible to change the fundamental spatial frequency of the induced grating, which is predefined by the electrode structure and equals 2I, where I is the spatial period of said electrodes.

U.S. Pat. No. 5,438,637 (NILSSON et al.) shows an electrically controllable optical filter device wherein a grating can be induced inside an electro-optical material, through the application of a voltage to the interdigital electrode system shown in FIG. 1 (prior art). The effect of the applied voltage can be approximated as spatially periodic effective index variation:

$$n(x, z) = n_0 + \sum_{m=1}^{\infty} n_m(z)\cos\left(\frac{2\pi m x}{\Lambda}\right)$$

where $n_0$ is the material intrinsic refractive index, and m denotes the spacial harmonic of the fundamental grating periodicity $\Lambda=2I$. Since the electro-optic effect is small, in most cases only the fundamental harmonic (m=1) is significant. The coupling coefficient between incident and diffracted modes is proportional to the amplitude of the effective index variation induced by the voltage on the electrodes. As mentioned above, increasing the applied voltage $V_0$ increases the coupling between the interacting modes, but it is impossible to change the fundamental spatial frequency of the grating or change an average value of the refractive index distribution which is the key idea of grating performance tuning.

OBJECTS AND SUMMARY OF THE INVENTION

An object of the present invention is therefore to provide a diffraction grating where both the refractive index and the spatial periodicity may be electrically adjusted.

A preferred object of the invention is to provide such a grating having a great flexibility and which can be easily integrated into different light control devices including waveguide and fiber optic applications.

Another preferred object of the invention is to provide a grating which is simple and inexpensive to manufacture.

Accordingly, the present invention provides an electrically adjustable diffraction grating for a waveguide. The grating first has a substrate, and an electrooptic structure extending over the substrate. The electrooptic structure includes a waveguide having a propagation axis.

A first and a second electrode structure are provided for generating an electric field therebetween. The first and second electrode structures are disposed on opposite sides of the electrooptic structure and parallel to the propagation axis of the waveguide. The first electrode structure has an interdigitated configuration defining a plurality of fingers, potentials $V_0$ and $V_0+\Delta V$ being applied to adjacent fingers. A potential is also applied to the second electrode structure. In this manner, the electric field generated between the first and second electrode structures induces a diffraction grating in the waveguide having a refractive index adjustable by varying $V_0$ and $\Delta V$, and a spatial periodicity adjustable by varying $\Delta V$.

The present invention also provides an electrically adjustable diffraction grating for modifying light externally incident thereon. The diffraction grating includes a substrate, and an electrooptic structure extending over the substrate.

A first and a second electrode structure for generating an electric field therebetween are provided. The first and second electrode structures are parallel to each other and disposed on opposite sides of the electrooptic structure. The first electrode structure has an interdigitated configuration defining a plurality of fingers. Potentials $V_0$ and $V_0+\Delta V$ are applied to adjacent fingers of the first electrode structure and a potential is also applied to the second electrode structure, so that the electric field generated between the first and second electrode structures induces a diffraction grating in the electrooptic structure having a refractive index adjustable by varying $V_0$ and $\Delta V$ and a spatial periodicity adjustable by varying $\Delta V$.

In one advantageous embodiment, the grating may be so formed that it acts as a Bragg filter. According to a further embodiment, the grating may be used for the collinear contradirectional coupling for the reflector function, thereby serving as an active optical filter for distributed feedback (DFB) and distributed Bragg reflection (DBR) lasers. Other embodiments relate to application in wavelength division multiplexing (WDM) systems for fiber ioptic communication. The grating may be used by itself or in combination with other electro-optic components to form integrated structures.

The present invention and its advantages will be better understood upon reading the following non-restrictive description of preferred embodiments thereof, made with reference to the accompanying drawings.

BRIEF DESCRIPTION OF THE DRAWINGS

FIG. 5A is schematic top view of a diffraction grating used in a waveguide grating filter in accordance with another embodiment of the invention;

FIG. 5B. is a partial cross-sectional side view of the waveguide grating filter of FIG. 5A.

DESCRIPTION OF PREFERRED EMBODIMENTS OF THE INVENTION

Figure 1:
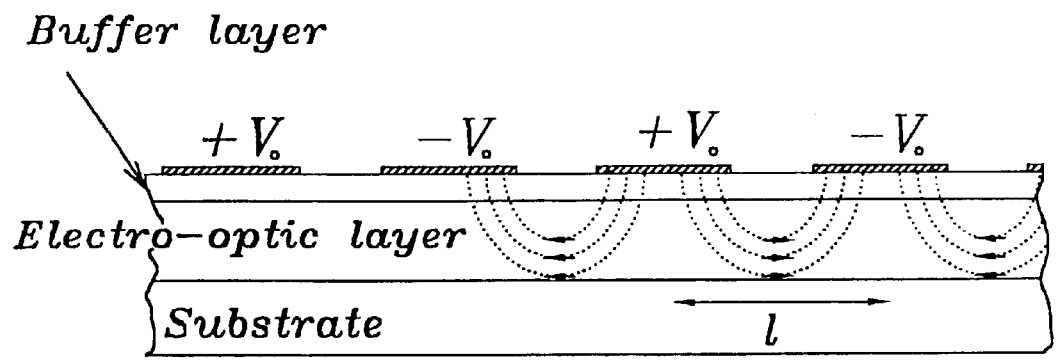
FIG. 1 is a cross-sectional side view of an electrooptic grating according to prior art, using a one-sided interdigital electrode system.
Figure 2:
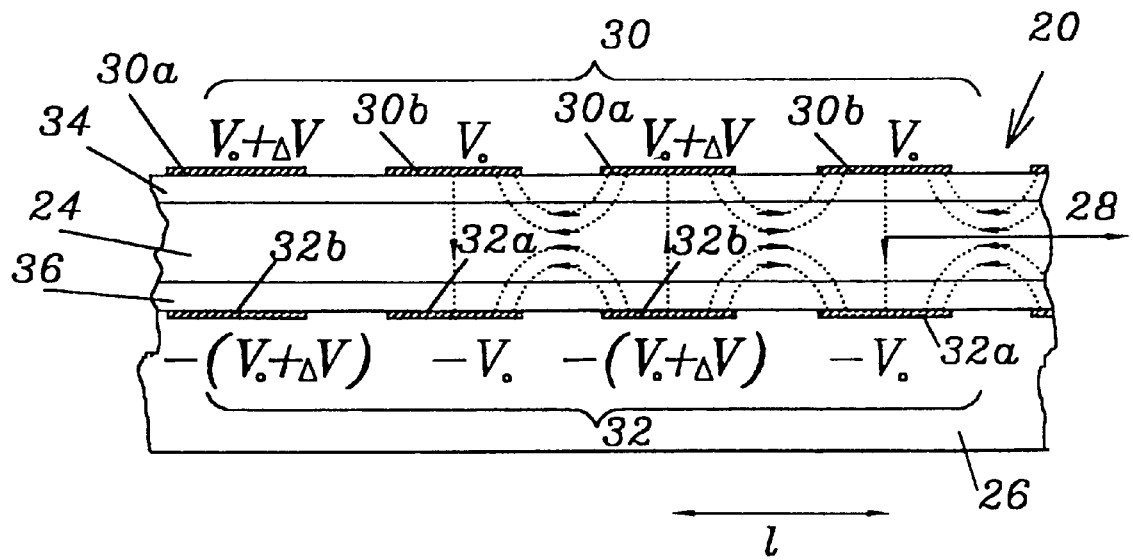
FIG. 2 is a cross-sectional side view of a tunable electrooptic diffraction grating with an electrically switchable period according to an embodiment of the present invention.

Referring to FIG. 2, there is shown a simplified embodiment of an electrically adjustable diffraction grating 20 for a waveguide 22. The grating includes an electrooptic structure 24 extending over a substrate 26. The electrooptic structure 24 has the property to have its refractive index changed when submitted to an electric field. The waveguide 22 is formed into the electrooptic structure 24, and optical waves propagate therein along propagation axis 28. In the illustrated embodiment, the electrooptic structure is an electrooptic slab 24 of material such as $LiNbO_3$, wherein the waveguide is formed.

First and second electrode structures 30 and 32 are provided on opposite sides of the electrooptic structure 24, parallel to the propagation axis 28. The first and second electrode structures 30 and 32 are submitted to different potentials to generate an electric field between them, and therefore in the waveguide. The first electrode structure 30 has an interdigitated configuration consisting in this embodiment of two interlocked electrodes 30a and 30b, each having a plurality of bar-like fingers connected at one end to give each electrode 30a and 30b a comb-like shape. Electrode 30a is under the electric potential $V_0$, while electrode 30b is under the electric potential $V_0 + \Delta V$. In this manner adjacent fingers are submitted to different potentials, creating the periodicity on the resulting electric field.

In the illustrated embodiment, the second electrode structure 32 has a configuration symmetric to that of the first electrode structure 30, being formed of two interdigitated comb-shaped electrodes 32a and 32b respectively submitted to potentials $-V_0$ and $-(V_0+\Delta V)$. The two electrode structures 30 and 32 preferably extend along superposed parallel planes on either side of the electrooptic structure 24. Again in this embodiment, the electrode structures 30 and 32 are aligned so that the fingers under the potentials $V_0$ and $-V_0$ and the fingers under the potentials $V_0+\Delta V$ and $-(V_0+\Delta V)$ are respectively in direct alignment with each other on either side of the propagation axis 28.

Preferably, first and second buffer layers 34 and 36 separate the electrooptic structure 24 from the electrode structures 30 and 32, to minimize interaction of the optical wave evanescent tail with the lossy metallic surfaces. The buffer layers 34 and 36 are formed from an insulating material, preferably $SiO_2$.

When the above explained potentials are apllied to electrodes 30a, 30b, 32a and 32c, it creates an electric potential distribution inside the electrooptic structure 24 that can be expressed in the form of a Fourier series:

$$\varphi(x, z) = V_0 \left[ E_0 z + \sum_{m=1}^{\infty} E_m(z) \cos\left(\frac{2\pi m x}{\Lambda}\right) \right]$$

where the expansion coefficients $E_0$ and $E_m$ can be controlled through the bias voltage $\Delta V$. Such an electric field inside the electrooptical structure 24 induces a refractive index distribution that can be presented in the following form:

$$n(x, z) = n_0 + n_0^{(E)}(V_0, \Delta V) + \sum_{m=1}^{\infty} n_m(z, \Delta V) \cos\left(\frac{2\pi m x}{\Lambda}\right)$$

where unlike the prior art case (see Eq. 1), the constant component of the electric field creates the constant component of the induced refractive index, $n_0^{(E)}$ that can be tuned through both applied voltages $V_0$ and $\Delta V$. In this manner, the average value of the refractive index of the grating is electrically adjustable. The coupling strength between incident and diffracted modes being proportional to the amplitude of the refractive index variation induced by the voltage on the electrodes, it can therefore be controlled electrically from the starting value $V_0=0$ and upwards. The refractive index change induced in an electrooptic structure with an effective period $\Lambda$ is proportional to the electric field strength $-\nabla\phi(x,z)$ for the Pockels electro-optic effect, and for the Kerr electro-optic effect, it is a quadratic function of the electric field $(\nabla\phi(x,z))^2$.

The induced refractive index distribution also has a variable part, presented in Eq. 3 as a Fourier expansion with harmonic components $n_m$, that can be controlled through the bias voltage $\Delta V$. Through this component, the fundamental spatial periodicity of the grating can also be electrically adjusted. For example, when $\Delta V=0$, all odd coefficients (m=1,3,5, . . . ) are equal to zero. All even coefficients (m=2,4,6, . . . ), including the constant term $E_0$, vanish when $\Delta V=-2V_0$, thereby establishing a refractive index grating with the fundamental periodicity $\Lambda=2I$. Both odd and even harmonics can be switched on by setting the bias voltage, for example, to $\Delta V=-V_0$. As can be seen from the above examples, the grating can be switched between two different, discrete spatial frequencies depending on how the electrodes are fed.

When a grating is employed as a Bragg line-reflection filter, the peak reflectivity of the grating can be adjusted by changing either the grating period or its refractive index. Using a constant component of the electric field between the electrodes 30a, 30b, and 32a, 32b, a change in the constant component of the refractive index can be induced, allowing to dynamically tune the wavelength in the filter. Shifting the peak reflectivity also affects transmission at nearby wavelengths, so the same effect can modulate light transmission. All these features of the proposed design make it serve as a building block for a number of devices of integrated optics and communication systems.

Figure 3:
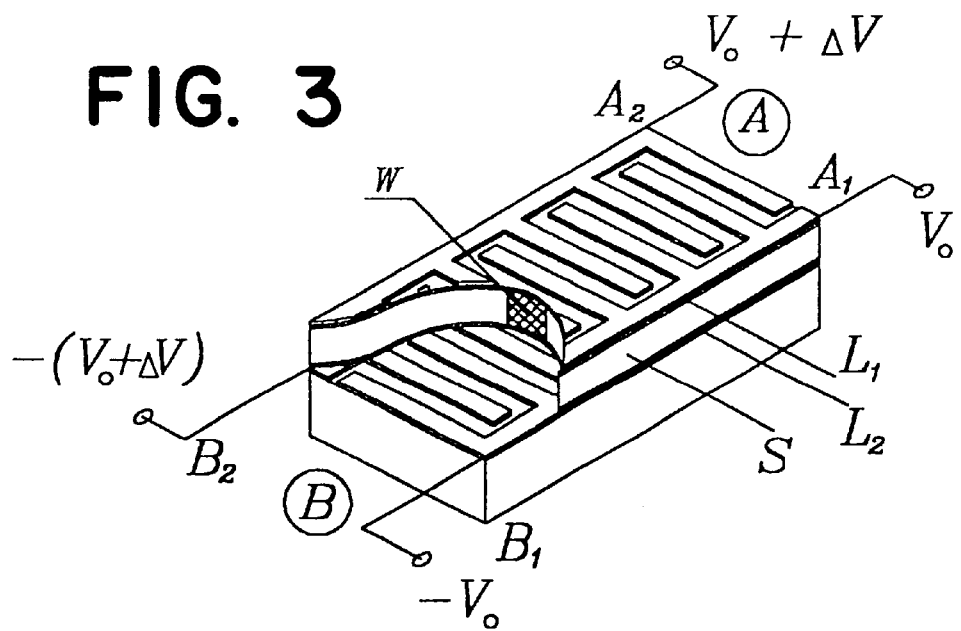
FIG. 3 is a perspective partly cross-sectional view of a diffraction grating used in an optical filter according to another embodiment of the present invention.

Referring to FIG. 3, there is shown an embodiment of an electrically controllable filter device on the basis of the present invention. The device comprises a waveguide W which is formed inside an electro-optic slab S, (e.g. of $LiNbO_3$ or an electro-optic polymer) and preferably has a thickness of approximately 0.5 to 2 μm and a width of about 5 μm. Two buffer layers, L1 and L2, separate the electro-optic slab from a double-sided electrode configuration in the form of interdigital electrode structures A1, A2, B1 and B2. The optical waveguide W has a refractive index n which somewhat exceeds the refractive index of the slab and the buffer layers. The device functions in such a manner that if the bias voltage is set to $\Delta V=0$, a grating having a period of $\Lambda=I$, as described above, which selectively couples light with the wavelength $\lambda_1$ from the guided mode to a forward propagating cladding mode. These cladding modes rapidly decay as they propagate inside the buffer layers, due to various loss mechanisms. With the bias voltage $\Delta V=-2V_0$, a grating of periodicity $\Lambda=2I$ is induced, which provides the coupling of light on the wavelength $2\lambda_1$. Depending on how the electrodes are fed, the filter can be switched to the different, discrete frequencies, and the peak reflection wavelength can be tuned, using the constant component of the electric field through $V_0$ adjustment.

Figure 4A:
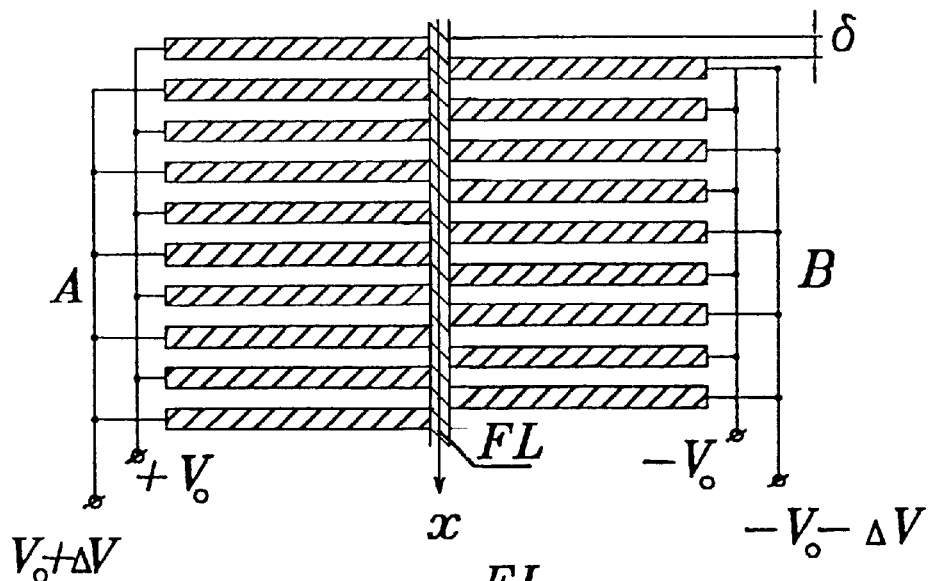
FIG. 4A is schematic top view of a diffraction grating used in an in-line fiber filter in accordance with yet another embodiment of the invention.
Figure 4B:
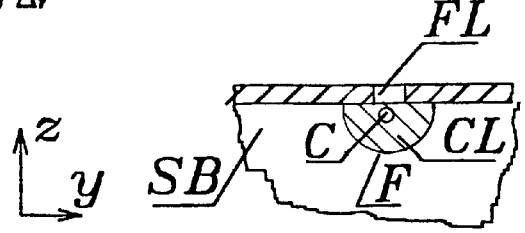
FIG. 4B is a partial cross-sectional side view of the fiber filter of FIG. 4A.

Referring to FIGS. 4A and 4B, there is shown an embodiment of the present invention applied to optical fibre communications, in an all-fibre electrically switchable filter. For this particular application, the present invention is embodied in planar geometry, that is that both the first and second electrode structures extend along a same plane on either side of the electrooptic structure. An optical fibre F is glued in the curved groove of a substrate SB and its cladding CL is polished laterally to reach the core C. The first and second electrode structures are placed on the substrate surface symmetrically at the same distance from the fibre axis, forming a gap therebetween. Because a traditional optical fibre is not electrooptically active, the gap between the fingers of the first and second electrode structures is filled with an electro-optic film FL, which is in contact with the optical fibre. Preferably, the electrode fingers of the respective electrode structures have a shift δ with respect to each other, where 0≤δ<2I. This shift plays two roles. It first decreases the electrode capacitance, which achieves its minimum at δ=I/2, in turn decreasing the switching time and energy consumption. Secondly, if so desired, this shift allows the generation of a tilted diffraction grating (it can be achieved only if $\Delta V \neq 0$). Applying the voltage in the manner described above generates an electric field between the first and second electrode structures left and right of the electrooptic structure which penetrates into the electrooptic film FL inducing therein a controllable index grating in accordance with the invention. This induced grating interacts with the evanescent field of the guided wave in the core. Setting the bias voltage $\Delta V$ allows the grating period $\Lambda$ to be changed between I, and 2I, consequently switching to different filtered frequencies in the manner described in the previous embodiments. By further adjusting the voltage $V_0$, the filter can advantageously be tuned beforehand in the vicinity of these filtered frequencies through a change in constant component of the induced refractive index. Modern nanoscale fabrication technology makes interdigitated electrode structures with submicron finger spacing feasible (K. Yamanouchi, T. Meguro, Y. Wagatsuma et al. <<Nanometer electrode fabrication technology using anodic oxidation resist films and application to 10 Ghz surface acoustic wave devices>>, Electronics Letters, 30, 1010 (1994), Z.Yu, S. J. Schablitsky S. Y. Chou, <<Nanoscale GaAs metal-semiconductor-metal photodetectors fabricated using nanoimprint lithography>> Appl. Phys. Lett., 74, 2381 (1999)), making the embodiment of FIGS. 4A and 4B applicable as an electro-optically tunable Bragg fiber filter for WDM telecommunication systems.

Referring to FIGS. 5A and 5B, there is shown a second embodiment in planar geometry applied to a traditional ridge waveguide W. The waveguide W is preferably formed by a well-established technique such as annealed proton exchange (APE) on the top surface of an electro-optic crystal (such as lithium niobate, lithium tantalate, KTP and so on). Alternatively, ions other than protons may be also in-diffused or ion exchanged into the substrate material. The APE waveguide increases the crystal extraordinary refractive index, forming a guide for light polarized along z-axis. For a z-cut crystal, this corresponds to TM polarized mode. Waveguides formed by alternative techniques, such as titanium in-diffusion in lithium niobate, may support both TM and TE polarization. The waveguide extends between the right and left electrode structures at an equal distance from the electrode fingers. The spaces between the waveguide W and the electrode fingers A and B are filled with buffer layers made of a dielectric material, such as $SiO_2$, having a refractive index lower than the refractive index of the waveguide. These buffer layers BL form the waveguide's cladding and protect a guided wave from lossy interaction with electrodes.

The planar architecture allows to tailor any shape of grating strength $v=n_1L/\lambda$ along its length (x direction) through the spatial modulation of the electrode voltage $V_0(x)$, where $n_1$ is the first-order refractive index change in the Fourier expansion of the refractive-index distribution, $\lambda$ is the vacuum wavelength, and L is the grating length. This can be done using a properly adjusted voltage or current-dividing circuit such as a resistor combination. Advantageously, it gives full control over the filter characteristics in terms of channel separation, side-lobe suppression and coupling efficiency over a large tuning range.

Figure 6:
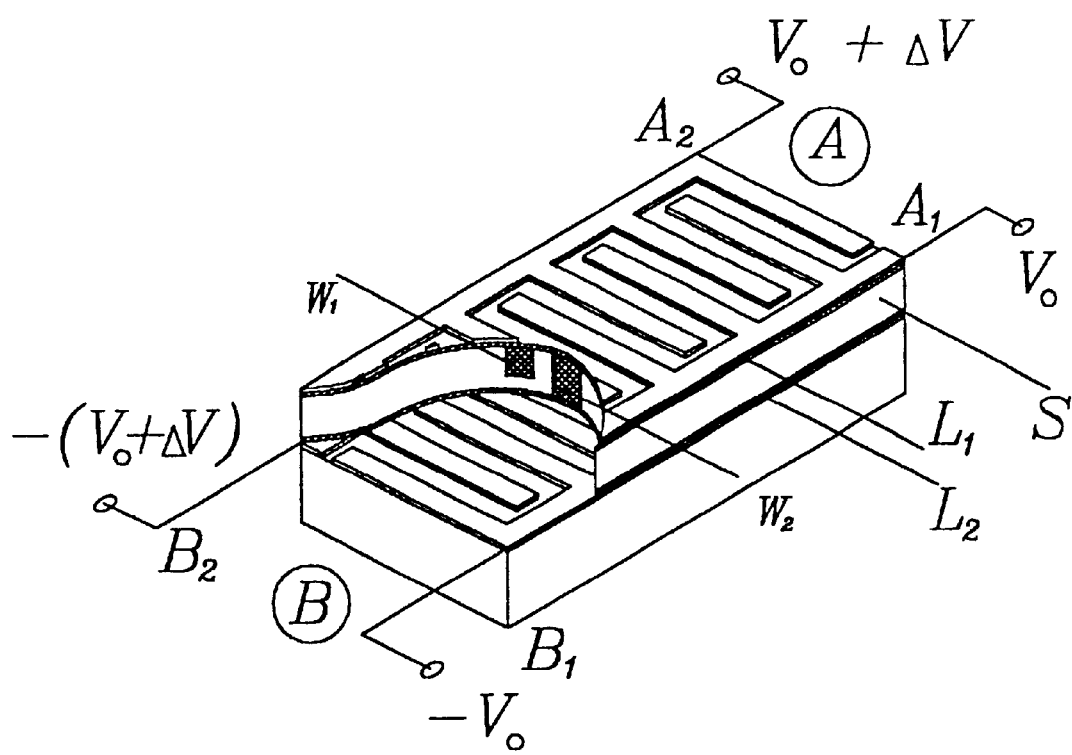
FIG. 6 represents a perspective partly cross-sectional view of a diffraction grating used in a grating assisted directional coupling of two waveguides according to another embodiment.

Referring to FIG. 6, there is shown an alternative embodiment of the present invention where the diffraction grating is incorporated into a directional coupler. In this embodiment, a first and a second waveguide $W_1$ and $W_2$ having respective refractive indices $n_{01}$ and $n_{02}$ are formed inside the electrooptic slab S. As with previous embodiments, both sides of the electrooptic slab are covered by nonelectrooptic buffer layers, preferably made of $SiO_2$. The first and second electrode structures are respectively arranged on the free surfaces of the buffer layers. The electrode structures are here in the form of comb-shaped electrodes $A_1$, $A_2$, $B_1$ and $B_2$ similar to those described above. Since the waveguides $W_1$ and $W_2$ are different, they have, at the same frequency $\omega/2\pi$, different propagation constants $\beta_1(\omega)=2\pi/\lambda_1(\omega)$ and $\beta_2(\omega)=2\pi/\lambda_2(\omega)$, respectively. The grating induced gives rise to a coupling between the waveguides $W_1$ and $W_2$, provided that $\beta_1(\omega)-\beta_2(\omega)=\pm 2\pi/\Lambda$. By changing the bias voltage $\Delta V$, the coupling between the two waveguides may be switched from one wavelength to another, while controlling at the same time the coupling strength by varying $V_0$. In different variants of this embodiment, the two waveguides shown in FIG. 6 may be non-parallel, or they may not even be straight. If it is desired, for instance, to spatially modify the interaction strength between the waveguides, the separation between them may be adjusted accordingly.

Figure 7:
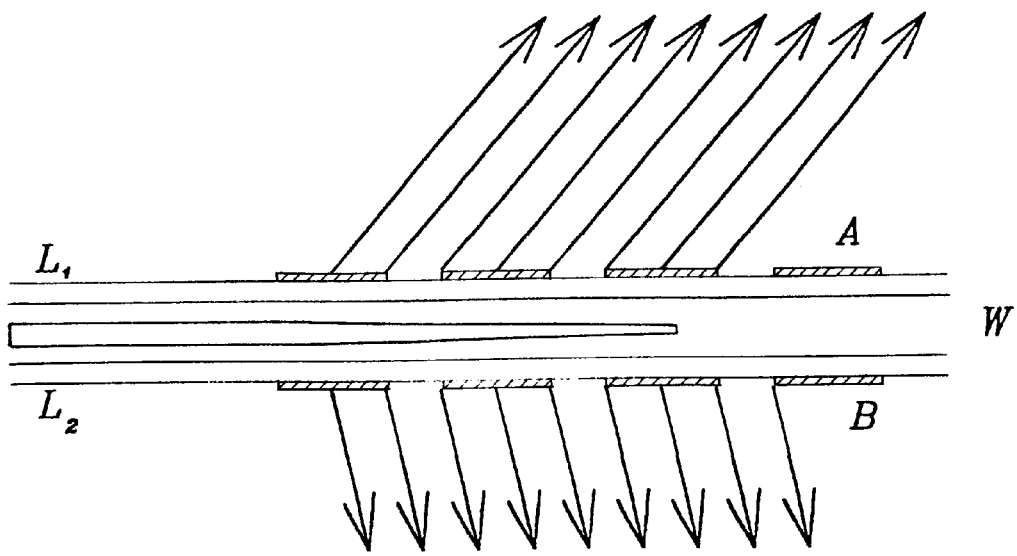
FIG. 7 is a cross-sectional side view of an output grating coupler in accordance with yet another embodiment of the invention.

Referring to FIG. 7, there is shown yet another embodiment of the present invention. An index grating is induced in a waveguide W by double-sided electrode structures A and B with buffer layers L1 and L2, arranged in a manner essentially analogue to what is described above. When a guided mode enters the grating region, the index grating yields spatial harmonics with propagation constants $\beta_q(\omega)=\beta_0(\omega)+2q\pi/\Lambda (q=0,\pm 1,\pm 2,\ldots)$. If orders q satisfying the conditions $|\beta_q|<2n_a\pi/\lambda$ or $|\beta_s|<2n_s\pi/\lambda$ are present, the harmonics radiate into the air and/or the substrate with the angle $\theta_q^a$ and $\theta_q^s$ given by $$2n_a\pi \sin \theta_q^a/\lambda = 2n_s\pi \sin \theta_q^s/\lambda = \beta_q = 2\pi n_e/\lambda + 2\pi q/\Lambda$$

respectively, where $n_a$ and $n_s$ are the refractive index of the air and the substrate, $\lambda$ is the wavelength in free space, $n_e$ is the guided mode refractive index, and $\Lambda$ is the grating period. Setting the bias voltage $\Delta V$ allows the grating period $\Lambda$ to be varied between I and 2I and consequently changes the output angles $\theta_q^a$ and $\theta_q^s$. This embodiment of an output grating coupler may for example be used for intraplane to interplane optical interconnections.

Figure 8A:
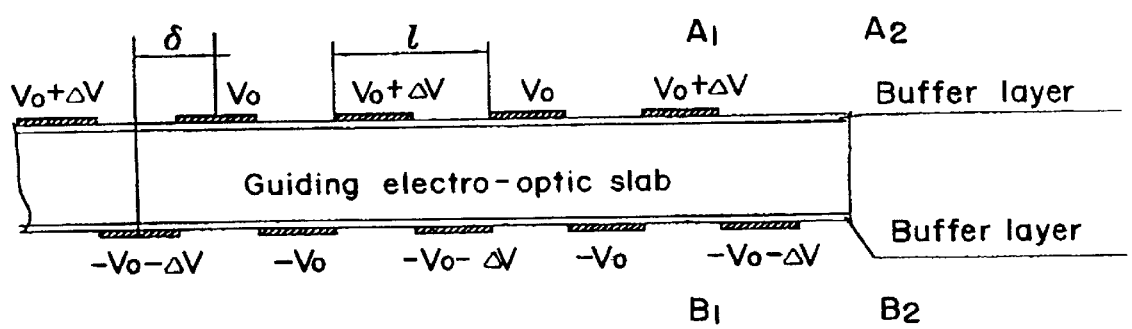
FIG. 8A is cross-sectional side view of a double-sided electrode structure which creates a switchable slanted grating inside an electrooptic film according to another embodiment.
Figure 8B:
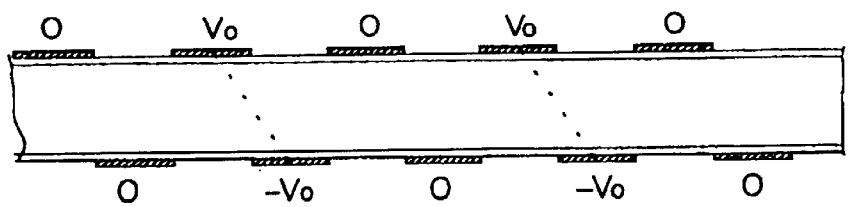
FIG. 8B shows the simplified refractive index distribution between the electrode structures of FIG. 8A when $\Delta V = -V_0$.
Figure 8C:
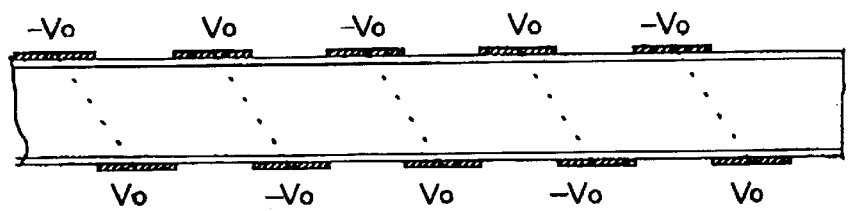
FIG. 8C shows the simplified refractive index distribution between the electrode structures of FIG. 8A when $\Delta V = -2V_0$.

Grating couplers can be used to excite and take out a guided wave. However the output is divided into approximately equal halves for air and substrate, as can be seen from FIG. 7. Referring to FIGS. 8A, 8B and 8C, another embodiment is shown where unnecessary radiation may be eliminated and the output power efficiency maximized. In this embodiment, the second electrode structure is in an offset alignment with the first electrode structure, so that corresponding potentials $V_0,-V_0$ and $V_0+\Delta V,-(V_0+\Delta V)$ are not vertically aligned. This shifting of the first and second electrode structures with respect to each other by a certain distance $\delta(0\leq\delta<2I)$ induces a slanted grating inside the electro-optic waveguide. FIG. 8A shows a general presentation of the design, and FIGS. 8B and 8C respectively illustrate the simplified refractive index distribution for $\Delta V=-V_0$ and $\Delta V=-2V_0$. Dashed lines connect the neighboring electrodes with the maximum potential difference $2V_0$. As can be seen, for an electrooptic material having a quadratic electro-optic effect, switching the bias voltage from $\Delta V=-2V_0$ to $\Delta V=-V_0$ changes the induced grating fundamental periodicity from I to 2I. An advantageous feature of this embodiment is that setting $\Delta V$ to 0 turns the slanted grating into a straight one.

Figure 9A:
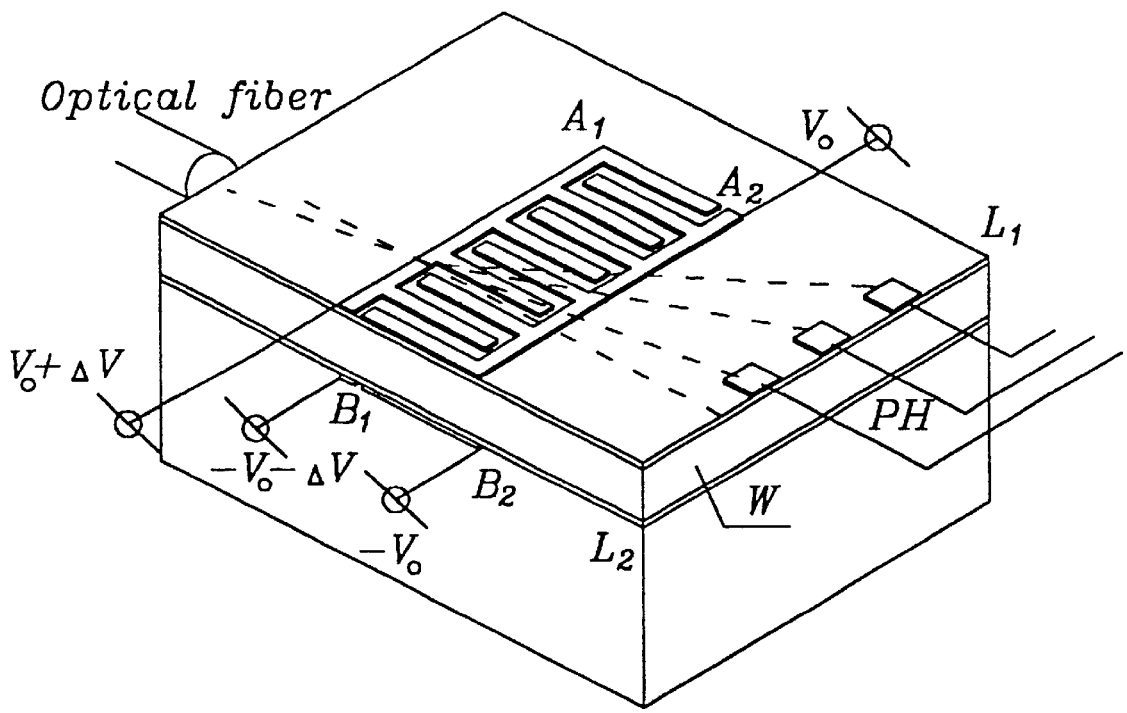
FIG. 9A is a perspective view of an optical switch using a Bragg grating in accordance with another embodiment of the invention.
Figure 9B:
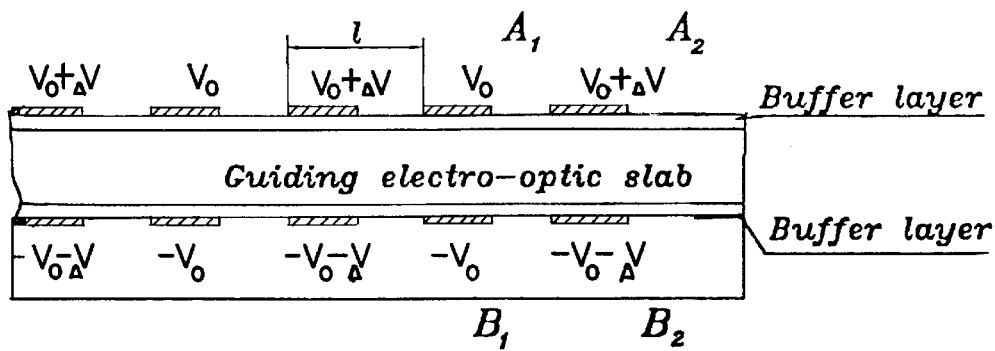
FIG. 9B is a cross-sectional side view of the electrode structures used in a first variant of the embodiment of FIG. 9A.

Referring to FIGS. 9A and 9B, there is shown an alternative embodiment of the invention, where a Bragg optical switch is realized through the coplanar diffraction of guided waves by a diffraction grating in accordance with the invention. In this embodiment, the propagation direction is set non-perpendicular to the length of the fingers of the electrodes, contrary to the previous embodiments. The grating diffracts the guided wave that satisfies the Bragg condition among the grating period, wavelength, and the incident angle of the guided wave. By switching the grating period between I and 2I or turning the voltage off, the switching between at least three states can be achieved. A multistate switching may be realized with a cascade array of gratings with different periods or orientation.

Figure 9C:
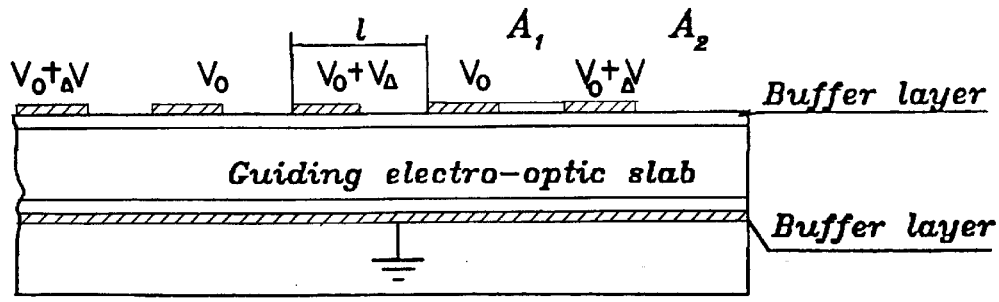
FIG. 9C is a cross-sectional side view of the electrode structures used in a second variant of the embodiment of FIG. 9A.

Referring to FIG. 9C, in a variant of the last embodiment, the second electrode structure may have the form of a single continuous electrode, for example a grounded conductive film. While simplifying the manufacturing process, this substitution does not affect the working of the present invention.

Figure 10:
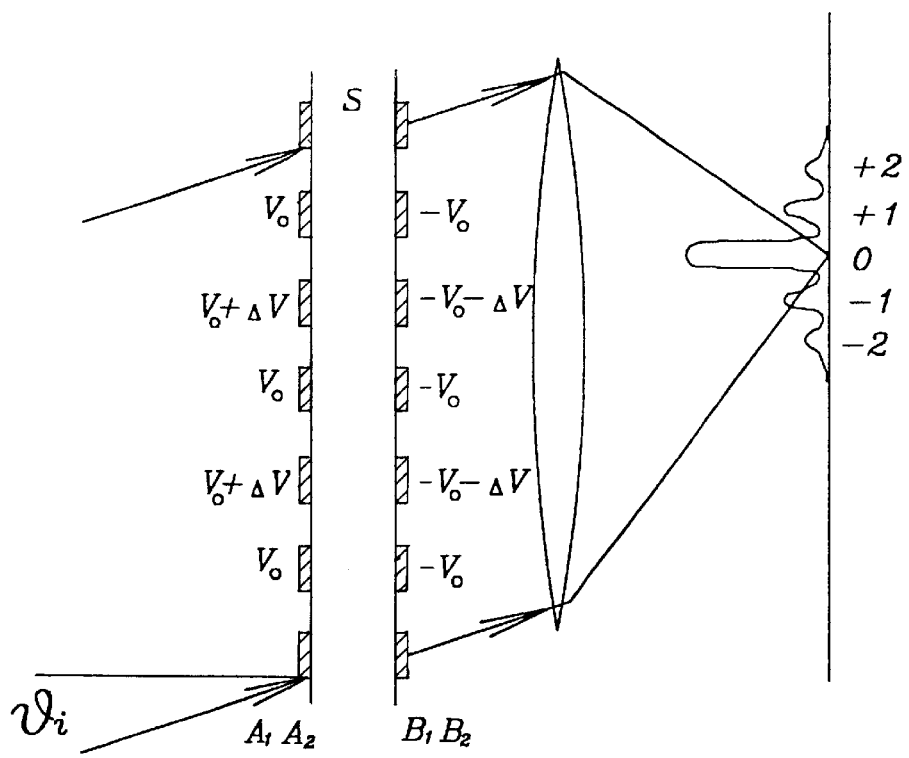
FIG. 10 is a schematic representation of the effect of a diffraction grating according to yet another embodiment of the invention on externally incident light.
Figure 12:
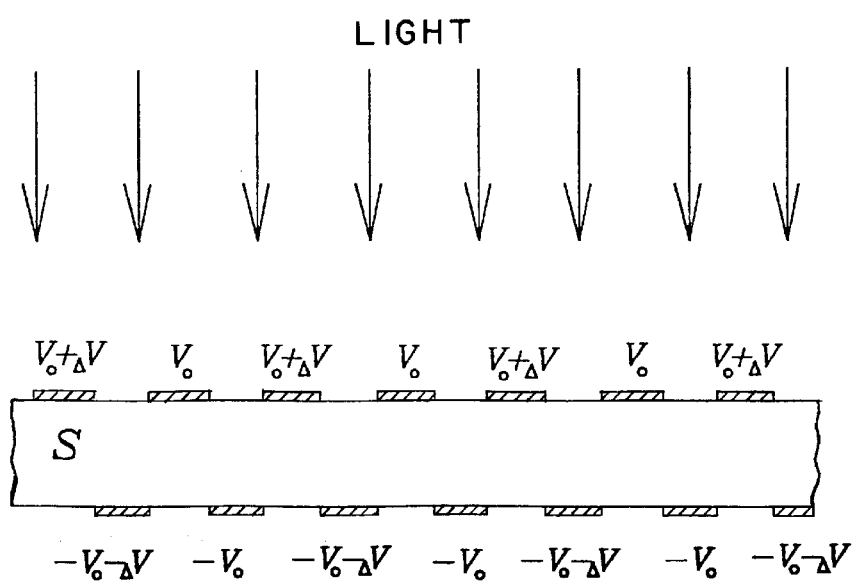
FIG. 12 is a cross-sectional side view of a diffraction grating with electrode structures on the opposite sides of an electrooptical substrate, shifted by a half of period with respect to each other.
Figure 11A:
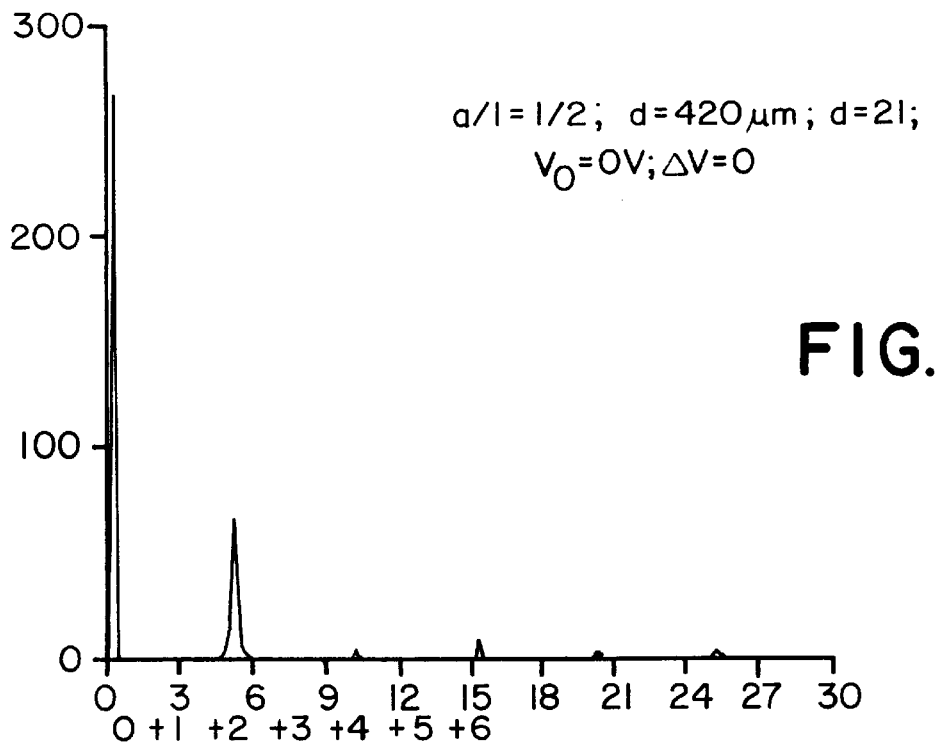
FIG. 11 is a series of graphs showing far field diffraction patterns on diffraction gratings with a PLZT electrooptic substrate with double sided interdigital electrode structures.
Figure 11B:
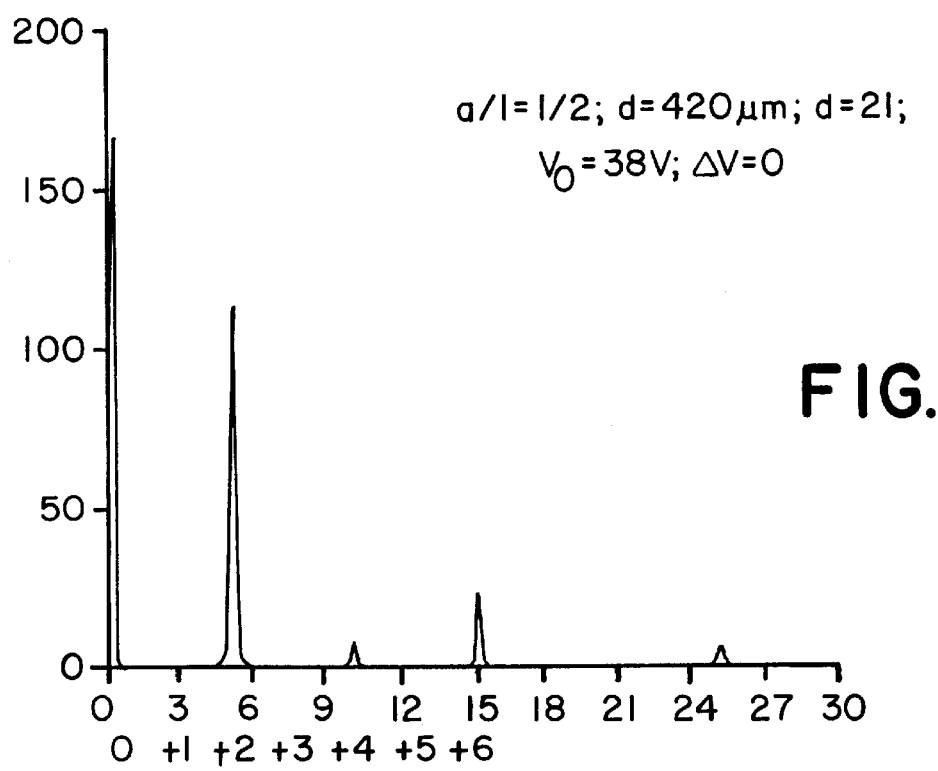
Figure 11C:
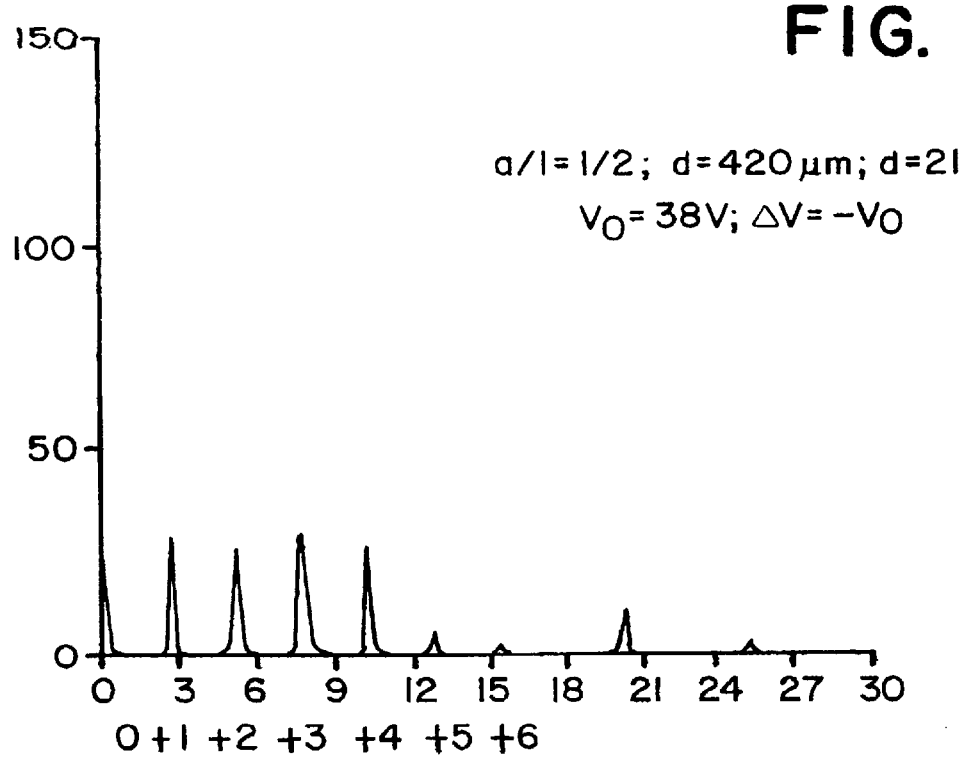
Figure 11D:
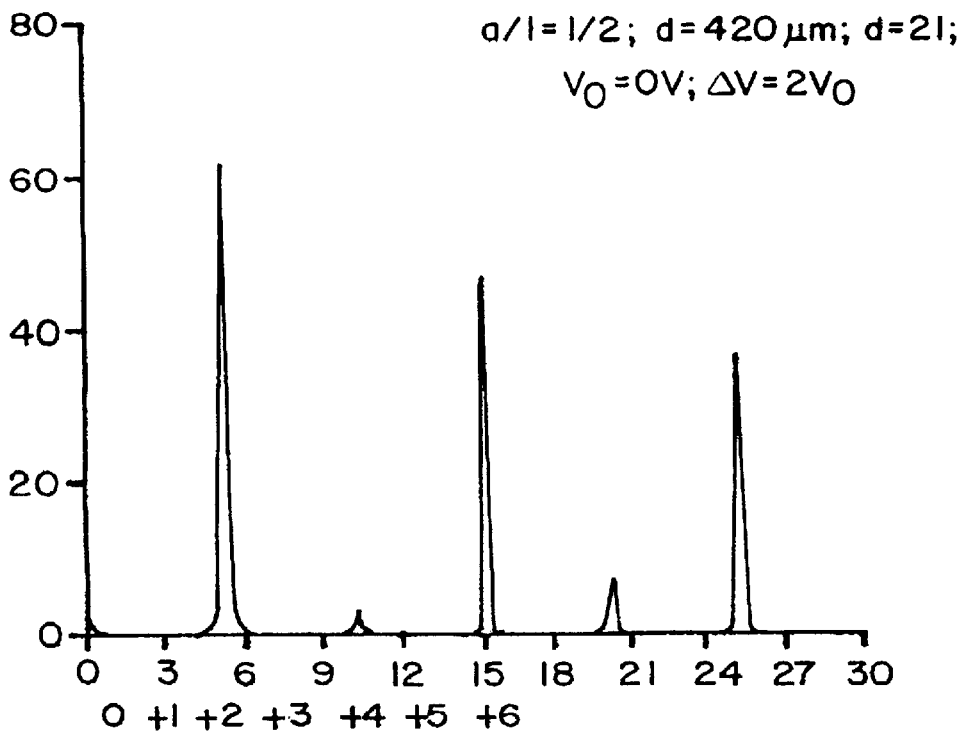

Referring to FIGS. 10 and 11A to 11D, there is shown an embodiment of a diffraction grating for externally incident light. An electrooptical substrate S is provided, that is, that in this embodiment, the electrooptic structure is an integral part of the substrate itself. The first and second electrode structures A1, A2 and B1, B2 are affixed to opposed surfaces of the substrate. The interdigital electrodes are prepared from a transparent conductive material such, as indium tin oxide (ITO). The substrate S is characterized by the fact that its refractive index is determined by the configuration and strength of the electric field applied thereto. When a linearly polarized light wave whose direction of polarization is parallel to the plane of incidence is incident on the surface at an angle $\theta_i$, the transmitted light wave is diffracted in accordance with the periodical refractive index distribution inside the electrooptical substrate, induced by the electric field applied to the electrodes A1, A2, and B1, B2. Consequently, the diffraction pattern may be changed with the voltage $V_0$ applied to the interdigital electrodes, redistributing the diffracted light into different diffraction orders. For example, the zero order can be completely shut out (see FIG. 11d). In addition, the even orders or odd orders of diffraction can be selectively turned on or off, which means that the grating can used as an optical switch with a high on/off ratio. FIGS. 11A to 11D illustrate the simulated results of far field diffraction under different bias voltages for electro-optic substrate of Lanthanum-modified Lead Zirconate Titanate (PLZT) 9/65/35 with a quadratic electro-optic effect. The horizontal axes are set to arbitrary spatial frequencies. Therefore, only the relative spacing among the diffraction orders are meaningful, and the left side of diffraction pattern with symmetrical negative diffraction orders is not shown. FIG. 11A shows the diffraction without applied voltage showing the contribution from the transparent ITO electrodes. Comparing FIG. 11B and FIG. 11C, it can be seen that the odd diffraction orders can be tuned on and off by switching the bias voltage $\Delta V$.

The phase contribution of ITO electrodes forms an intrinsic grating that diffracts part of the incident light into high orders as it can be seen from FIG. 11A, where the resulting diffraction pattern is presented for double-sided ITO interdigital electrodes with period I=210 $\mu$m, width a=105 $\mu$m and ITO thickness of 0.1 $\mu$m. For some applications it can reduce the equivalent transmittance (i.e., light efficiency) of the switch when no voltage is applied to the electro-optic substrate.

Referring to FIGS. 12 and 13A to 13E there are shown different embodiments of a diffraction grating for externally incident light similar to that of FIG. 10, where the interdigital electrodes of one electrode structure are shifted by half of a period with respect to the interdigital electrodes of the other electrode structure. This positioning of the electrodes eliminates intrinsic electrode diffraction for normally incident light waves, because the phase delay on the electrodes of one side of the substrate is compensated by the phase delay on the electrode of the opposite side.

Figure 13A:
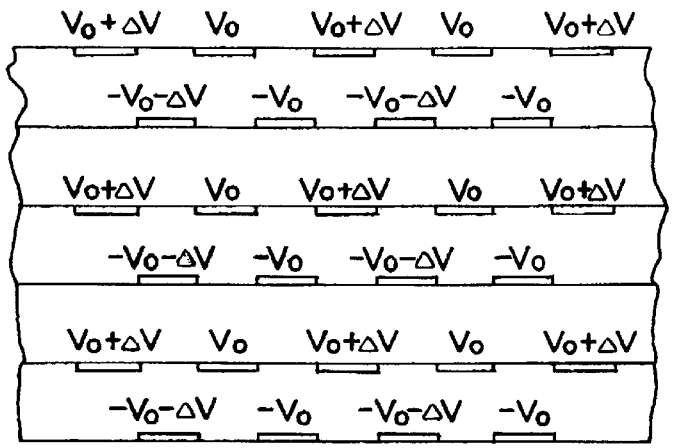
FIG. 13 is a cross-sectional side view of an optical switch using a plurality of pairs of electrode structures as shown in FIG. 12.
Figure 13B:
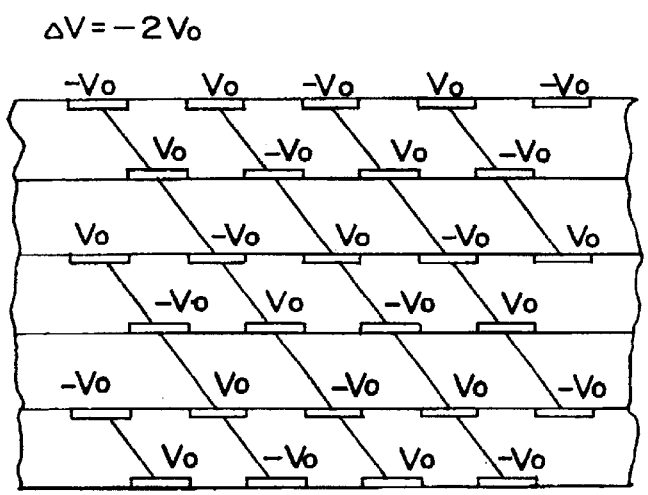
Figure 13C:
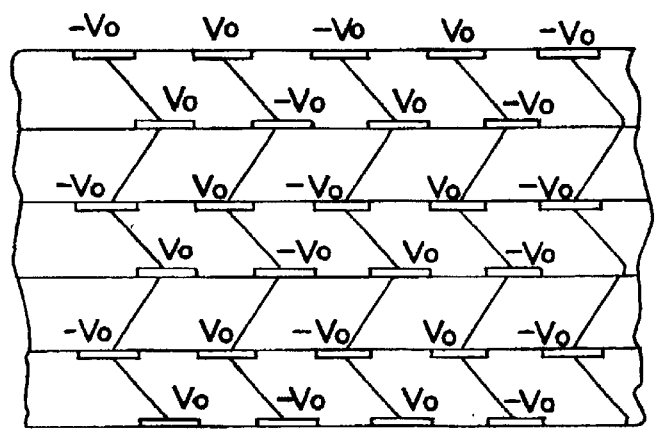
Figure 13D:
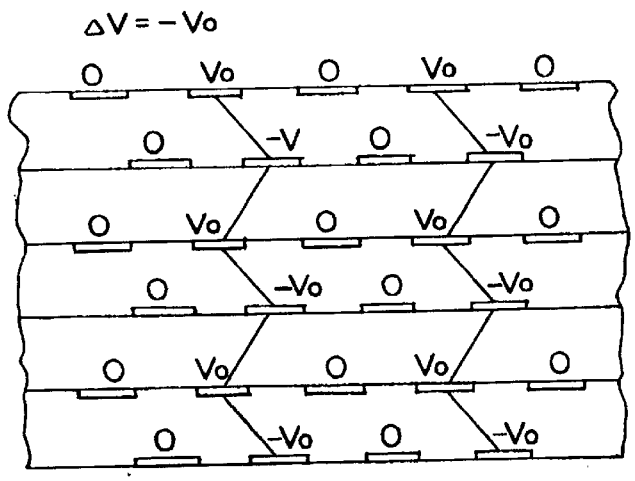
Figure 13E:
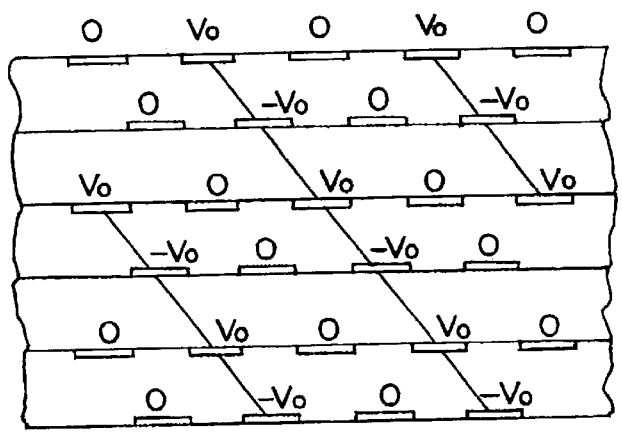

The thickness of the electro-optic slab is basically an interaction length for the transmitted light wave. If this length is small:

$$h \ll \frac{n\Lambda^2}{2\pi\lambda}$$

where n is the average value of the slab refractive index, $\lambda$ is the wavelength of the diffracted light and $\Lambda$ is the grating period. Many diffraction orders are generated and little selectivity is shown. This is the so-called Raman-Nath diffraction regime. However only two diffraction orders with high angular and spectral selectivity occur in the Bragg diffraction regime when the interaction length is long compared with $n\Lambda^2/(2 \pi\lambda)$. Unfortunately for the design shown in FIG. 12, the pattern of the exited electric field decays rapidly with distance away from the electrodes. The pattern is essentially washed out at a distance from the electrodes equal to the electrode structure period. The next embodiment in FIG. 13A shows a solution to this drawback; the interactive interaction length can be increased by repeating the structure of FIG. 12 a number of times. In FIG. 13B to 13C the dashed lines connect the neighbouring electrodes with a maximum potential difference ($2V_0$) therebetween. These lines can give an idea about periodicity of the refractive index distribution for different values of the bias voltage $\Delta V$. The spatial period of the induced refractive index grating may be easily doubled by switching from $\Delta V=-2V_0$ to $\Delta V=-V_0$ (see FIG. 13B and 13E). Adjusting $V_0$, the average value of the refractive index of the device may be varied, and its selectivity therefore tuned to the required wavelength. A 9/65/35 PLZT ceramic can be a perfect electrooptic material for this embodiment. The electrodes must be transparent for the operating light spectrum, and a patterned ITO film might be a good candidate for visible and infrared light.

Figure 14:
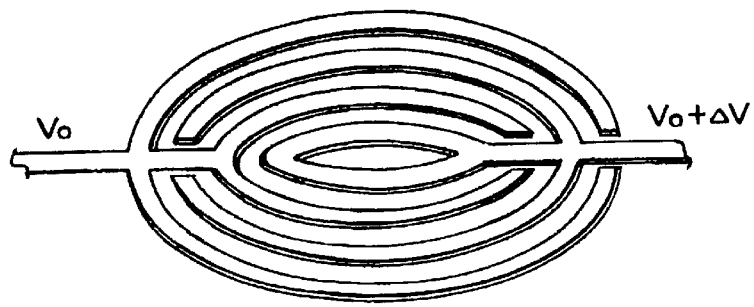
FIG. 14 is a top view of a curvilinear electrode structure according to yet another embodiment of the invention.

A planar grating induced by the electrode structures with rectilinear fingers will produce a flat output phase front from a flat input phase front. In some cases however it may be desirable to produce a convergent output wave from a collimated beam, as in the case of some applications requiring focusing. By patterning a set of curved electrode fingers, a slanted or straight grating with curved refractive index fringes may be induced in the waveguide. For example an electrode structure having the form of concentric rings is shown in FIG. 14. With such ring-shaped electrode structures mounted on both sides of the electrooptic structure, symmetrically or with a half period shift, and applying different potentials thereon in the manner described above, a Fresnel zone plate with focal length that is switchable from one position to another on the optical axis can be obtained.

Of course, numerous changes could be made to the preferred embodiment disclosed hereinabove without departing from the scope of the invention as defined in the appended claims.

What is claimed is:

1. An electrically adjustable diffraction grating for a waveguide, comprising;
    a substrate;
    an electrooptic structure extending over the substrate, said electrooptic structure comprising a waveguide having a propagation axis;
    a first and a second electrode structure for generating an electric field therebetween, said first and second electrode structures being disposed on opposite sides of the electrooptic structure and parallel to the propagation axis of the waveguide, the first electrode structure having an interdigitated configuration defining a plurality of fingers, where potentials $V_0$ and $V_0+\Delta V$ are applied to adjacent fingers of said first electrode structure and a potential is applied to the second electrode structure, so that the electric field generated between the first and second electrode structures induces a diffraction grating in the waveguide having a refractive index adjustable by varying $V_0$ and $\Delta V$ and a spatial periodicity adjustable by varying $\Delta V$.

2. A diffraction grating according to claim 1, wherein the second electrode structure has an interdigitated configuration defining a plurality of fingers, and the potential applied to said second electrode structure comprises potentials $-V_0$ and $-(V_0+\Delta V)$ being applied to adjacent fingers.

3. A diffraction grating according to claim 2, wherein the first and second electrode structures extend along superposed parallel planes.

4. A diffraction grating according to claim 3, wherein the first and second electrode structures are symmetric so that the fingers under the potentials $V_0$ and $-V_0$ and the fingers under the potentials $V_0+\Delta V$ and $-(V_0+\Delta V)$ are respectively in alignment with each other on either sides of the propagation axis.

5. A diffraction grating according to claim 3, wherein the first and second electrode structures are symmetric so that the fingers under the potentials $V_0$ and $-V_0$ and the fingers under the potentials $V_0+\Delta V$ and $-(V_0+\Delta V)$ are respectively in offset alignment with each other on either side of the propagation axis.

6. A diffraction grating according to claim 3, further comprising a first and a second buffer layer, each of said first and second buffer layers being made from an insulating material and extending between the waveguide and a corresponding one of the first and second electrode structure.

7. A diffraction grating according to claim 3, wherein the electrooptic structure comprises an electrooptic slab, the waveguide being formed therein.

8. A diffraction grating according to claim 2, wherein the first and second electrode structures both extend along a same plane.

9. A diffraction grating according to claim 8, wherein:

a gap extends between the first and second electrode structures along the plane thereof; and the electrooptic structure comprises an electrooptic film disposed in said gap, and an optical fiber extending along said gap and in contact with the electrooptic film.

10. A diffraction grating according to claim 8, wherein:

a gap extends between the first and second electrode structures along the plane thereof; and the electrooptic structure comprises a ridged waveguide formed in an electrooptic material, said ridged waveguide being disposed in the gap.

11. A diffraction grating according to claim 10, further comprising a first and second buffer layer extending between the electrooptic crystal and a corresponding one of the first and second electrode structure.

12. A diffraction grating according to claim 2, wherein the fingers of the first and second electrode structures are rectilinear.

13. A diffraction grating according to claim 2, wherein the fingers of the first and second electrode structures are curvilinear.

14. A diffraction grating according to claim 1, wherein the second electrode structure is a grounded conductive film.

15. A diffraction grating according to claim 14, wherein the first and second electrode structures extend along superposed parallel planes.

16. An electrically adjustable diffraction grating for modifying light externally incident thereon, said diffraction grating comprising;

a substrate;

an electrooptic structure extending over the substrate;

a first and a second electrode structure for generating an electric field therebetween, said first and second electrode structures being parallel to each other disposed on opposite sides of the electrooptic structure, the first electrode structure having an interdigitated configuration defining a plurality of fingers, where potentials $V_0$ and $V_0+\Delta V$ are applied to adjacent fingers of said first electrode structure and a potential is applied to the second electrode structure, so that the electric field generated between the first and second electrode structures induces a diffraction grating in the electrooptic structure having a refractive index adjustable by varying $V_0$ and $\Delta V$ and a spatial periodicity adjustable by varying $\Delta V$.

17. A diffraction grating according to claim 16, further comprising:

at least one additional electrode structure, each additional electrode structure extending parallel to the first and second electrode structure;

at least one additional electrooptic structure, each additional electrooptic structure extending between two adjacent electrode structures.

18. A diffraction grating according to claim 16, wherein the externally incident light has a propagating direction extending perpendicular to the first and second electrode structures.

19. A diffraction grating according to claim 16, wherein the externally incident light has a propagating direction extending at an angle with the first and second electrode structures.

20. A diffraction grating according to claim 16, wherein the electrooptic structure is integral to the substrate.

* * * * *